(12) United States Patent
Marti et al.

(10) Patent No.: US 8,494,554 B2
(45) Date of Patent: Jul. 23, 2013

(54) MOBILE DEVICE LOCATION ESTIMATION (75) Inventors: Lukas M. Marti, Santa Clara, CA (US);
Robert Mayor, Half Moon Bay, CA (US); Ronald K. Huang, San Jose, CA (US); Glenn Donald MacGougan, San Jose, CA (US); Jason Dere, San Jose, CA (US); Yefim Grosman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 13/153,104

(22) Filed: Jun. 3, 2011

(65) Prior Publication Data

US 2012/0309410 A1  Dec. 6, 2012

(51) Int. Cl.
*H04W 24/00* (2009.01)
*H04M 11/04* (2006.01)

(52) U.S. Cl.
USPC .................................. 455/456.1; 455/404.2

(58) Field of Classification Search
USPC .. 455/456.1–457, 404.1, 404.2, 414.1–414.4, 455/418–422.1, 432.1–444, 11.1, 13.1, 41.2, 455/550.1, 552.1, 553.1, 556.1, 556.2, 500, 455/517, 524, 525, 561; 370/310.2, 315, 370/328, 331–333, 338, 352–356
See application file for complete search history.

(56) References Cited

U.S. PATENT DOCUMENTS

| | | | |
|---|---|---|---|
| 6,587,692 B1 * | 7/2003 | Chen et al. | 455/456.1 |
| 6,865,395 B2 * | 3/2005 | Riley | 455/456.1 |
| 7,257,411 B2 * | 8/2007 | Gwon et al. | 455/456.1 |
| 7,395,073 B2 * | 7/2008 | Gwon et al. | 455/456.1 |
| 7,433,696 B2 | 10/2008 | Dietrich et al. | |
| 2003/0063589 A1 | 4/2003 | Haines et al. | |
| 2004/0002344 A1 * | 1/2004 | Moeglein et al. | 455/456.1 |
| 2004/0162084 A1 * | 8/2004 | Wang | 455/456.1 |
| 2005/0037775 A1 | 2/2005 | Moeglein et al. | |
| 2005/0208952 A1 | 9/2005 | Dietrich et al. | |
| 2008/0113672 A1 | 5/2008 | Karr et al. | |
| 2009/0047973 A1 * | 2/2009 | MacNaughtan et al. | 455/456.1 |

(Continued)

FOREIGN PATENT DOCUMENTS

| | | |
|---|---|---|
| WO | 2010044872 | 4/2010 |
| WO | 2010059934 | 5/2010 |

OTHER PUBLICATIONS

Gwon, et al. "Robust Indoor Location Estimation of Stationary and Mobile Users". Published at IEEE INFOCOM 2004. Retrieved from the Internet at URL:<http://citeseerx.ist.psu.edu/viewdoc/download?doi=10.1.1.4.4258&rep=rep1&type=pdf>.

(Continued)

*Primary Examiner* — San Htun
(74) *Attorney, Agent, or Firm* — Fish & Richardson P.C.

(57) ABSTRACT

Methods, program products, and systems of location estimation using multiple wireless access gateways are disclosed. In general, in one aspect, a mobile device can scan and detect multiple wireless access gateways. The mobile device can determine an initial estimate of distance between the mobile device and each wireless access gateway. The mobile device can receive, from a server, location data of the detected wireless access gateways. The location data can include an estimated location of each wireless access gateway, an uncertainty of the estimated location, and a reach of each wireless access gateway. The mobile device can assign a weight to each estimated location using the uncertainty, the reach, and the initial estimate. The mobile device can estimate the location of the mobile device using the weighted locations.

33 Claims, 9 Drawing Sheets

U.S. PATENT DOCUMENTS

| | | |
|---|---|---|
| 2009/0075677 A1 | 3/2009 | Seger et al. |
| 2009/0280801 A1 | 11/2009 | Malik |
| 2009/0310585 A1 | 12/2009 | Alizadeh-Shabdiz |
| 2011/0117924 A1 | 5/2011 | Brunner et al. |
| 2011/0177831 A1 | 7/2011 | Huang |

OTHER PUBLICATIONS

Kaemarungsi., "Design of Indoor Positioning Systems Based on Location Fingerprinting Technique". Dated 2005. Retrieved from the Internet at URL:<http://rv74.homelp.net/docs/DESIGN%20OF%20INDOOR%20POSITIONING%20SYSTEMS%20BASED%20ON%20LOCATION%20FINGERPRINTING%20TECHNIOUE.pdf>.

PCT Notification of Transmittal of the International Search Report and the Written Opinion of the International Searching Authority, or Declaration., International Application No. PCT/US2012/40209, Dated Aug. 22, 2012, 11 pages.

Communication and European Search Report on European Patent Application No. EP 12 16 9864, mailed Sep. 28, 2012, 6 pages.

* cited by examiner

MOBILE DEVICE LOCATION ESTIMATION

TECHNICAL FIELD

This disclosure relates generally to geographic location determination.

BACKGROUND

A wireless communications network can employ various technologies for mobile devices to communicate wirelessly. The wireless communications network can include one or more wireless access gateways for connecting a mobile device to another mobile device or to a wired network. The wireless access gateways can include, for example, cell towers or wireless access routers of a wireless local area network (WLAN), a metropolitan area network (MAN), or a personal area network (PAN). Each of the wireless access gateways can serve mobile devices located in a geographic area (e.g., a cell of a cellular network).

A mobile device can include one or more location-based applications that are configured to perform location-specific tasks. A mobile device equipped with a receiver of a global navigation satellite system (GNSS), such as the Global Positioning System (GPS), can use a location determined by the GNSS as an input to a location-based application. A mobile device not equipped with a GNSS receiver, or a mobile device located in an area where GNSS signals are weak (e.g., inside buildings), can use alternative ways to determine a location. For example, if the location of a wireless access gateway is known, and a mobile device is connected to the wireless access gateway, the mobile device can estimate a current location using a location of the connected wireless access gateway.

SUMMARY

Methods, program products, and systems of location estimation using multiple wireless access gateways are disclosed. In general, in one aspect, a mobile device can scan and detect multiple wireless access gateways. The mobile device can determine an initial estimate of distance between the mobile device and each wireless access gateway. The mobile device can receive, from a server, location data of the detected wireless access gateways. The location data can include an estimated location of each wireless access gateway, an uncertainty of the estimated location, and a reach of each wireless access gateway. The mobile device can assign a weight to each estimated location using the uncertainty, the reach, and the initial estimate. The mobile device can estimate the location of the mobile device using the weighted locations.

The techniques described in this specification can be implemented to achieve the following exemplary advantages. The locations of wireless access gateway can be used to supplement GNSS location estimation. When the mobile device is not equipped with GNSS functions, the mobile device can use the locations of wireless access gateways to determine a current location. For a mobile device equipped with GNSS, the location estimation can be used to supplement the GNSS when the GNSS signals are weak. In addition, GNSS signal acquisition time can be improved over a conventional mobile device. The mobile device can estimate a location using the locations of wireless access gateways to assist in determining to which GNSS satellite the mobile device will connect.

The estimated location of a wireless access gateway can include an altitude. Thus, mobile device can determine a current location in a three-dimensional space. The three-dimensional location information can be useful, for example, in determining on which floor of a high-rise building the mobile device is located. The altitude can supplement latitude or longitude coordinates. Accordingly, for example, an altitude profile can be created for a street or a park.

The details of one or more implementations of mobile device location estimation are set forth in the accompanying drawings and the description below. Other features, aspects, and advantages of mobile device location estimation will become apparent from the description, the drawings, and the claims.

BRIEF DESCRIPTION OF THE DRAWINGS

Like reference symbols in the various drawings indicate like elements.

DETAILED DESCRIPTION

Overview of Mobile Device Location Estimation

Figure 1:
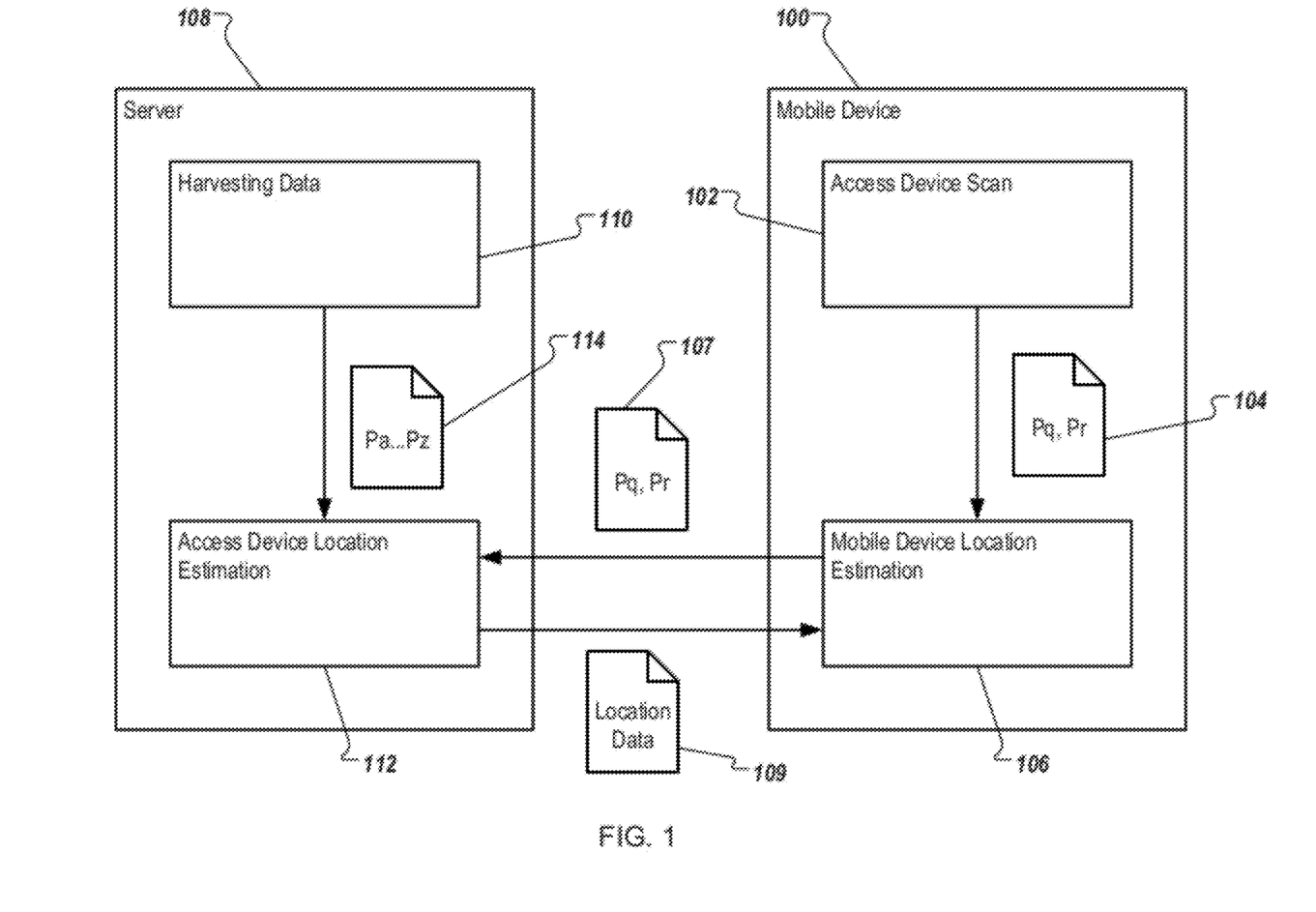
FIG. 1 is a block diagram providing an overview of exemplary techniques of mobile device location estimation.

FIG. 1 is a block diagram providing an overview of exemplary techniques of mobile device location estimation. Mobile device 100 is an exemplary mobile device configured to estimate a current location using locations of multiple wireless access gateways. Mobile device 100 can perform access device scanning operations 102 to detect one or more wireless access gateways (e.g., cell towers or wireless routers). Access device scanning operations 102 can produce a list of access device identifiers 104. Access device identifiers 104 can include cell identifiers of cell towers, or media access control (MAC) addresses of wireless routers, or both. Each of the access device identifiers 104 can represent a wireless access gateway whose signal mobile device 100 has detected in the access device scanning operations 102. Access device scanning operations 102 can detect any number of wireless access gateways. As an example, access device identifiers 104 can include identifiers Pq and Pr of the detected wireless access gateways.

Mobile device 100 can perform mobile device location estimation operations 106 to estimate a location of mobile device 100. Mobile device location estimation operations 106 can send request 107 to server 108 requesting location data for the detected wireless access gateways Pq and Pr. Request 107 can include all or a portion of access device identifiers 104.

In response to request 107, mobile device 100 can receive location data 109 from server 108. Location data 109 can include a location of each of the detected wireless access gateways, an uncertainty value of each location, and a reach of each of the detected wireless access gateways. Mobile device location estimation operations 106 can assign a weight to each of the received locations. The weight of a location associated with a wireless access gateway (e.g., Pq) can be determined based on an uncertainty value associated with the estimated location, the reach, and a closeness between mobile device 100 and the wireless access gateway. The closeness between mobile device 100 and the wireless access gateway can include a coarse measure (e.g., a two-level measure "close" or "not close") of distance between mobile device 100 and the wireless access gateway. Mobile device 100 can determine a location of mobile device 100 using the weighted locations, for example, by averaging the weighted locations. Further details of assigning weights to received locations and calculating the location of mobile device 100 will be discussed below in reference to FIGS. 2A-2B.

Location data 109, including locations of the detected wireless access gateways can be determined by server 108, independently from mobile device location estimation operations 106 of mobile device 100. Server 108 can include a system of one or more computers connected to mobile device 100 through a wired or wireless communications network. Server 108 can generate location data 109 using data harvesting operations 110 and access device location estimation operations 112.

Data harvesting operations 110 can include receiving anonymous location information from multiple mobile devices. The anonymous location information can include location coordinates associated with each of the wireless access gateways Pa . . . Pz. The location coordinates can include latitude, longitude, and altitude coordinates. The latitude, longitude, and altitude coordinates can be derived from GNSS-enabled mobile devices providing the coordinates. The wireless access gateways can be wireless access gateway located within a communication range of, or are connected to, the GNSS-enabled mobile devices. Data harvesting operations 110 can produce a set 114 of identifiers of wireless access gateways tagged with location coordinates.

Access device location estimation operations 112 can generate location data 109 from set 114 of identifiers of wireless access gateways. Access device location estimation operations 112 can estimate a location of each of the wireless access gateways Pa . . . Pz by applying a probability density function to the received locations associated with each wireless access gateway. The probability density function can include a sufficient statistic for estimating the location of each wireless access gateway. Based on the set 114 of identifiers and associated locations, access device location estimation operations 112 can determine an uncertainty value of each estimated location, and a reach of each wireless access gateway.

Figure 2A:
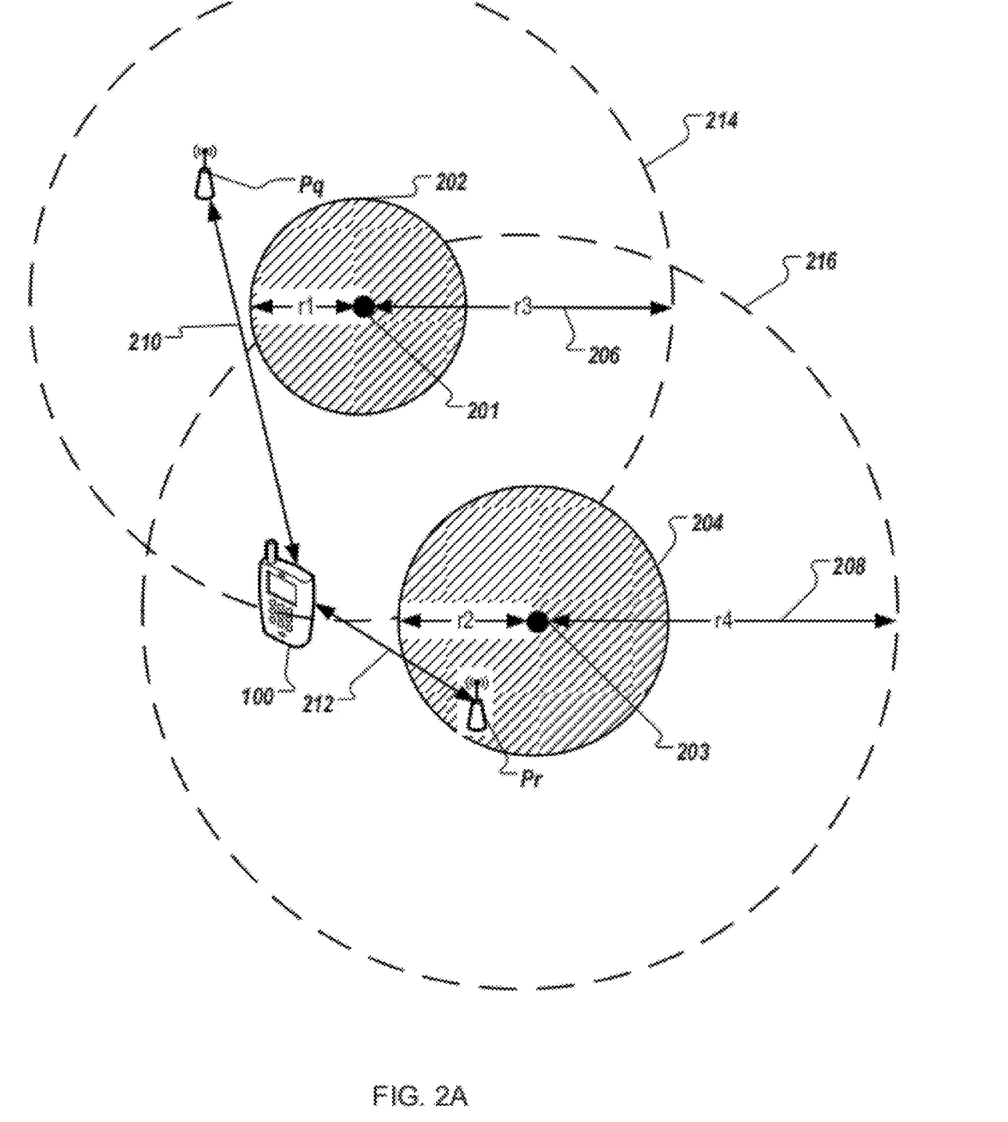
FIG. 2A is a diagram of exemplary mobile device location estimation based on estimated locations of wireless access gateways.

FIG. 2A is a diagram of mobile device location estimation based on estimated locations of wireless access gateways. The location estimation can include weighting locations with various factors, which will be described below.

The estimated locations 201 and 203 being weighted can be contained in estimated location regions 202 and 204. Location data 109 (as described in reference to FIG. 1) can include location information on wireless access gateways Pq and Pr. The location information can include estimated locations 201 and 203 on wireless access gateways Pq and Pr, respectively. Each of the estimated locations 201 and 203 in estimated location regions 202 and 204 can include a latitude and a longitude. An estimated location of a wireless access gateway is a likely location of a mobile device that can detect the wireless access gateway. The estimated locations 201 and 203 need not correspond to the physical location of the wireless access gateways Pq and Pr. In FIG. 2A, the physical location of wireless access gateway Pq is outside the estimated location region 202 of Pq; the physical location of wireless access gateway Pr is inside the estimated location 204 of Pr.

Some factors for weighting the estimated locations 201 and 203 can include uncertainty values for the estimated locations 201 and 203. Each of the estimated locations 201 and 203 can be associated with an uncertainty value. The uncertainty values can indicate an estimation accuracy of the each of the estimated locations 201 and 203. In FIG. 2A, the uncertainty values are represented as radii r1 and r2 of estimated location regions 202 and 204.

Some factors for weighting the estimated locations 201 and 203 can include reaches 206 and 208 of wireless access gateways Pq and Pr. The location information in location data 109 can include reaches 206 and 208 of wireless access gateways Pq and Pr, respectively. A reach of a wireless access gateway can indicate a distance from how far away the wireless access gateway can be expected to be observed by a mobile device. The reach can be determined, for example, based on a distance between a location of a mobile device in harvested data and the estimated location. The values of reaches 206 and 208 are represented by radii r3 and r4 of the circles 214 and 216 representing reaches 206 and 208, respectively. Reaches 206 and 208 can be associated with the estimated locations of wireless access gateways Pq and Pr. Accordingly, wireless access gateways Pq and Pr need not be physically located at centers of circles 214 and 216.

Some factors for weighting the estimated locations 201 and 203 can include a closeness between mobile device 100 and the detected wireless access gateway Pq or Pr to determine a location of mobile device 100. In some implementations, the closeness between mobile device 100 and the detected wireless access gateway Pq and Pr can be represented by distances 210 and 212 between mobile device 100 and the detected wireless access gateways Pq and Pr, respectively. In some implementations, the closeness can be determined using a received signal strength indication (RSSI) measured at mobile device 100. The closeness can be determined using a round trip time (also known as round trip delay time) of a signal between mobile device 100 and wireless access gateway Pq, or a signal between mobile device 100 and wireless access gateway Pr. In some implementations, the closeness can be determined using a bit error rate of a signal.

The closeness need not correspond to respective physical distances between mobile device 100 and wireless access gateways Pq and Pr. For example, a physical barrier between mobile device 100 and wireless access gateway Pq can significantly attenuate the signal traveling between mobile device 100 and wireless access gateway Pq such that the RSSI indicates that mobile device 100 and wireless access gateway Pq are farther apart than they physically are apart. Because other factors are used in calculating a location of mobile device 100, the technology disclosed in this specification has an advantage over a conventional device that uses RSSI and triangulation alone, in that errors caused by interferences from physical barriers can be mitigated by the other factors.

In weighting the estimated location using the factors, mobile device 100 can apply the following strategy. A larger reach of a wireless access gateway can provide lower weight of the estimation location of the wireless access gateway. A higher uncertainty value associated with an estimated location can provide lower weight of the estimation location of the wireless access gateway. A greater distance between mobile device 100 and a wireless access gateway can provide a lower weight of the estimation location of the wireless access gateway.

In some implementations, the weight Wp of an estimated location of wireless access gateway P (e.g., Pq or Pr) can be measured using the following formula.

$$Wp=(A-AB)C+AB, \quad (1)$$

where Wp is a weight of the estimated location (e.g., the estimated locations 201 and 203) of wireless access gateway P; A is an uncertainty weight, which can be a component of the weight Wp determined based on an uncertainty value associated with the estimated location of wireless device P; B is a reach weight, which can be a component of the weight Wp determined based on a reach (e.g., reach 206 or 208) of wireless device P; C is a closeness weight, which can be a component of the weight Wp determined based on a closeness between mobile device 100 and wireless access gateway P. In some implementations, the closeness can be an initial measurement of a distance between mobile device 100 and wireless access gateway P using the RSSI.

In some implementations, the uncertainty weight A, reach weight B, and closeness weight C can be calculated using the following formulae:

$$A = e^{-\frac{uncert_{measured}}{\tau_{uncert}}}; \quad (2)$$

$$B = e^{-\frac{reach_{measured}}{\tau_{reach}}}; \quad (3)$$

$$C = e^{\frac{RSSI_{measured}-RSSI_{MAX}}{\tau_{RSSI}}}; \quad (4)$$

where $uncert_{measured}$ is a the uncertainty value associated with an estimated location of wireless access gateway P, as determined on a server (e.g., server 108 of FIG. 1); $reach_{measured}$ is a reach associated with wireless access gateway P as determined on a server; $RSSI_{measured}$ is an RSSI measured at mobile device 100; $RSSI_{MAX}$ is a maximum RSSI value; and τ models exponential decay as a function of the respective parameter uncert, reach, or RSSI.

Mobile device 100 can determine a location of mobile device 100 using the weighted estimated locations 201 and 203. Determining the location of mobile device 100 can include calculating a weighted average of the weighted estimated locations 201 and 203.

Figure 2B:
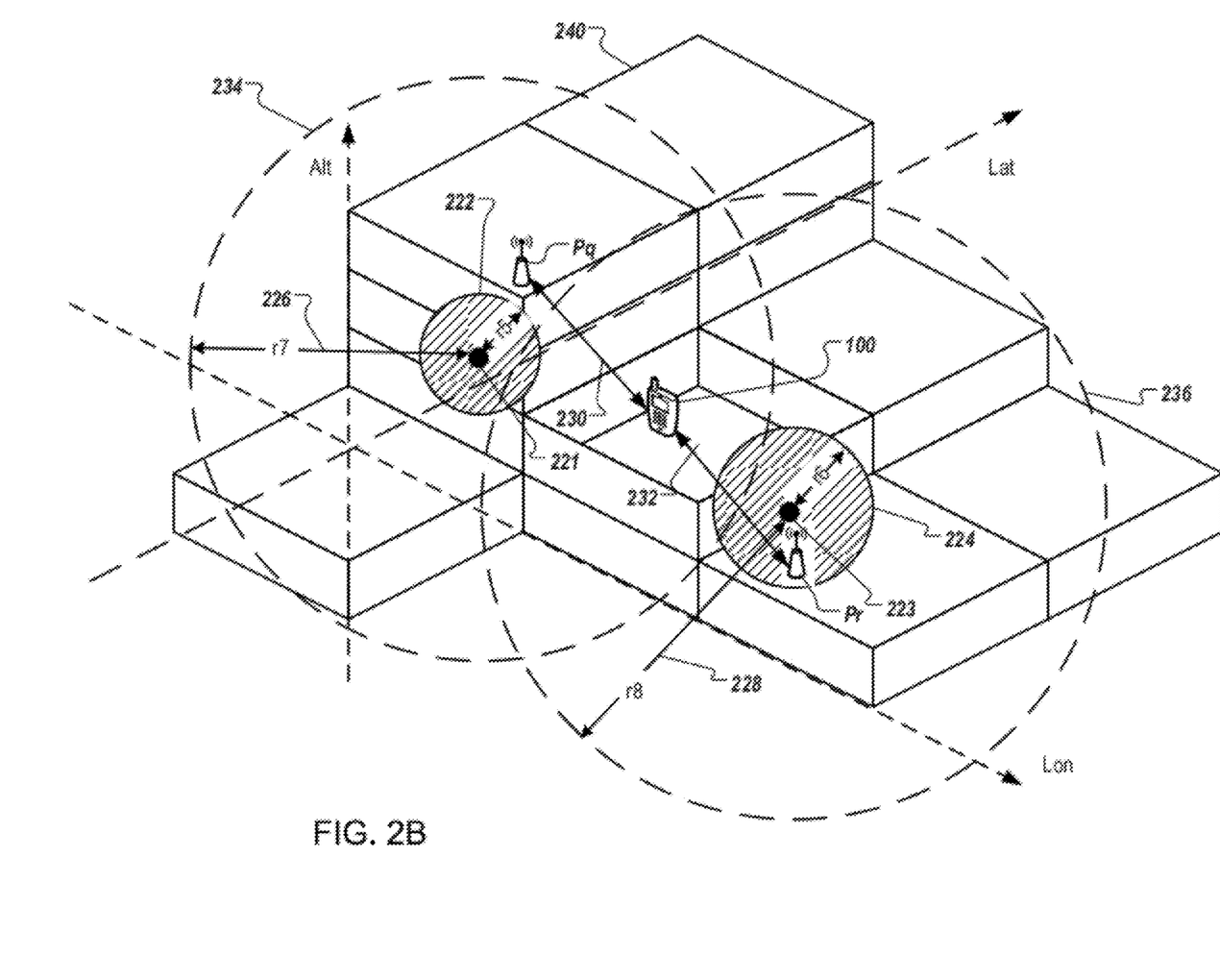
FIG. 2B is a diagram of exemplary mobile device location estimation based on estimated locations of wireless access gateways in a three-dimensional space.

FIG. 2B is a diagram of mobile device location estimation based on estimated locations of wireless access gateways in a three-dimensional space. The three-dimensional space can be defined by latitude, longitude, and altitude. The location estimation can include determining a latitude, a longitude, and an altitude of mobile device 100 by weighting estimated locations 221 and 223 of wireless access gateways Pq and Pr.

Estimated locations 221 and 223 of wireless access gateways Pq and Pr can each include a latitude coordinate, a longitude coordinate, and an altitude coordinate of the respective wireless access gateway. Each of the locations 221 and 223 can be associated with an uncertainty value. The uncertainty values are represented in FIG. 2B as radii r5 and r6 of spheres 222 and 224, respectively. Reaches 226 and 228 of wireless access gateways Pq and Pr can be represented by radii r7 and r8 of spheres 234 and 236 representing reaches 226 and 228, respectively. Reaches 226 and 228 can be associated with the estimated locations of wireless access gateways Pq and Pr. Accordingly, wireless access gateways Pq and Pr need not be physically located at center of spheres 234 and 236.

Mobile device 100 can determine closeness between mobile device 100 and wireless access gateways Pq and Pr using coarse measurements of distances 230 and 232 between mobile device 100 and wireless access gateways Pq and Pr, respectively. Mobile device 100 can assign a weight to each of the estimated locations 221 and 223 based on the corresponding uncertainty value, reaches 226 and 228, and distances 230 and 232. In some implementations, mobile device can apply formulae (1)-(4) as described above in reference to FIG. 2A.

By determining an altitude in addition to a latitude and longitude, mobile device 100 can provide more customized location-based services than a conventional mobile device. For example, mobile device 100 can identify on which floor and in which section of building 240 mobile device 100 is located, and provide for display information related to businesses on that floor and in that section.

Exemplary Component of a Location Estimation System

Figure 3:
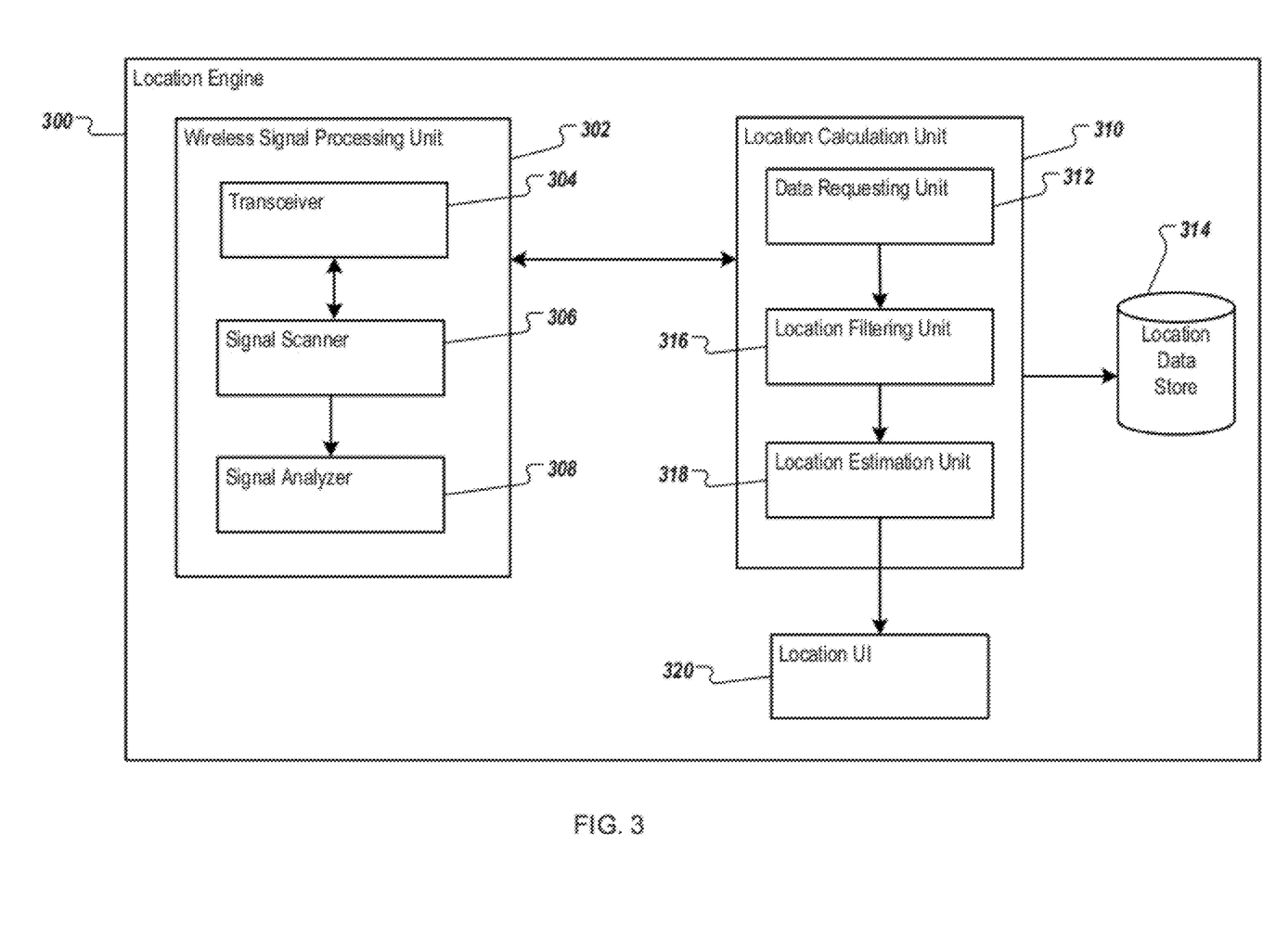
FIG. 3 is a block diagram illustrating functional components of an exemplary system of location estimation.

FIG. 3 is a block diagram illustrating functional components of an exemplary location estimation system 300. System 300 can be a component of mobile device 100 as described above in reference to FIGS. 1 and 2A-2B.

System 300 can include wireless signal processing unit 302. Wireless signal processing unit 302 can include a baseband processor for processing signals from a cell tower, or a wireless processor (e.g., a WiFi™ chip) for processing signals from a wireless router, or both. Wireless signal processing unit 302 can include transceiver 304. Transceiver 304 is a component of wireless signal processing unit 302 that is configured to send and receive wireless signals. Wireless signal processing unit 302 can include signal scanner 306 and signal analyzer 308. Signal scanner 306 is a component of wireless signal processing unit 302 that is configured to cause transceiver 304 to scan one or more communication channels to detect wireless signals from wireless access gateways (a cell tower or a wireless router). The signals can include one or more identifiers of the wireless access gateways. Signal analyzer 308 is a component of wireless signal processing unit 302 that is configured to analyze the detected wireless signal and determine the round trip time, the bit error rate, the RSSI, or other characteristics of the signal that can indicate a closeness between system 300 and the cell tower or wireless router.

Wireless signal processing unit 302 can send the identifiers of the wireless access gateway, as well as the information indicating the closeness, to location calculation unit 310. Location calculation unit 310 is a component of system 300 that is configured to determine a location of mobile device 100. Location calculation unit 310 can include an application processor and computer instructions for controlling the application processor. Location calculation unit 310 can include data requesting unit 312. Data requesting unit 312 can be a component of location calculation unit 310 that is configured to request location data of the detected wireless access gateways using the identifiers from wireless signal processing unit 302. Data requesting unit 312 can send the identifiers to a server using a wireless connection through transceiver 304, using a wired connection, or from location data store 314. Location data store 314 can include a non-transitory storage device storing the location data. The location data can include estimated locations of the detected wireless access gateways, uncertainty values, and reaches of the detected wireless access gateways.

Location calculation unit 310 can include location filtering unit 316. Location filtering unit 316 can be a component of location calculation unit 310 that is configured to analyze the location data and filter out one or more outliers from the location data. Filtering out the one or more outliers can reduce a probability that a defective estimated location of a wireless access gateway is used in subsequent calculations, and thus improve the accuracy location estimation of mobile device 100. Further details of operations of filtering out outliers will be described below in reference to FIG. 5.

Location calculation unit 310 can include location estimation unit 318. Location estimation unit 318 is a component of location calculation unit 310 that is configured to estimate a location of system 300 based on the filtered location data. Further details of the operations of estimating the location are described above in references to FIGS. 2A-2B.

Location calculation unit 310 can optionally include location user interface 320. Location user interface 320 can include a display device configured to display the estimated location on a map. The display device can additionally or alternatively be configured to display location related information. The location related information can include, for example, names of businesses on a floor of a building, when system 300 is on that floor of that building according to a latitude, a longitude, and an altitude of the estimated location. An example location user interface 320 is described in further details below in reference to FIG. 6.

Exemplary Location Estimation Processes

Figure 4:
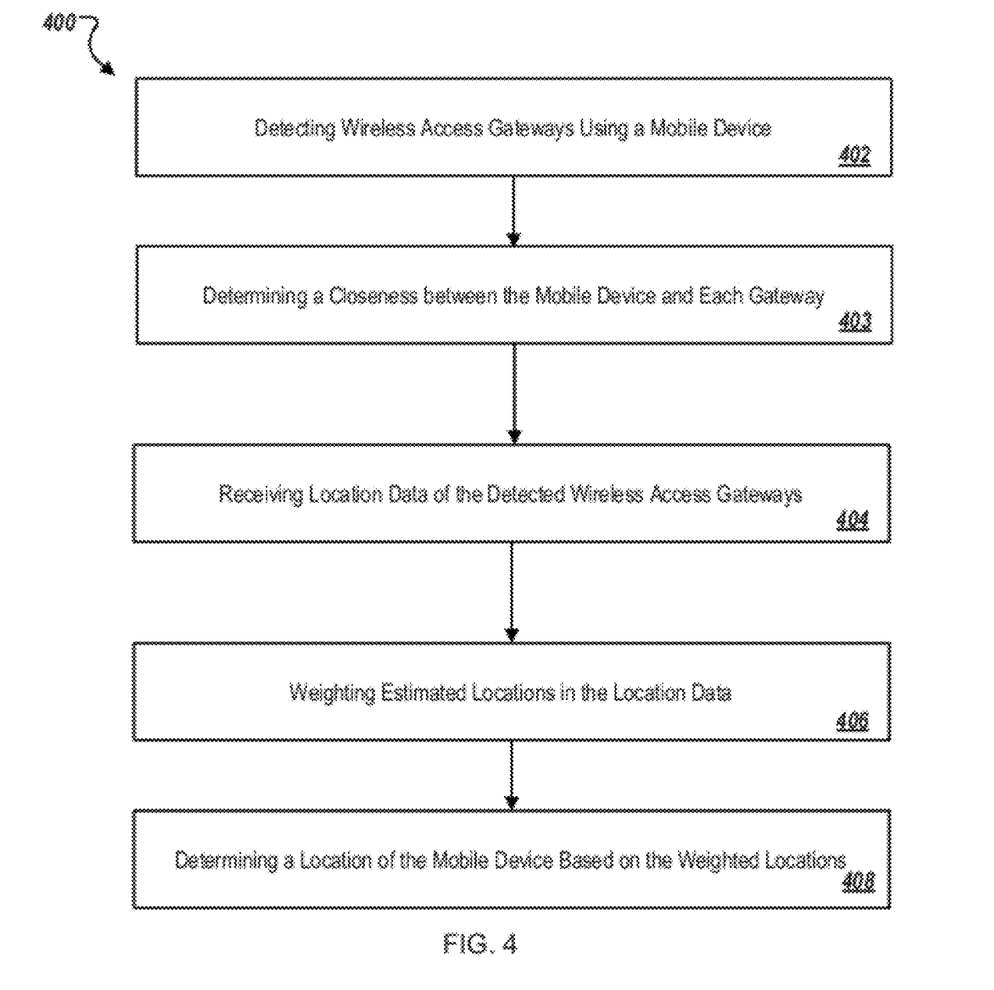
FIG. 4 is a flowchart of an exemplary process of mobile device location estimation.

FIG. 4 is a flowchart of exemplary process 400 of mobile device location estimation. Process 400 can be performed by system 300 of mobile device 100, as described above in reference to FIG. 3.

System 300 can detect (402), on mobile device 100, multiple wireless access gateways. Each of the wireless access gateways can include at least one of a cell tower, a wireless router, or a or a Bluetooth™ device.

System 300 can determine (403) a closeness between mobile device 100 and each wireless access gateway. The closeness can be an initial measurement of a distance between mobile device 100 and each wireless access gateway based on a signal traveling between mobile device 100 and each of the wireless access gateways. The closeness can correspond to a measured distance or a physical distance between mobile device 100 and each of the wireless access gateways. Determining the closeness can be based on a signal strength of a signal from the wireless access gateway (e.g., RSSI), a round-trip time of a signal between mobile device 100 and the wireless access gateway, a bit error rate of a signal between mobile device 100 and the wireless access gateway, or a combination of the above.

System 300 can receive (404) location data associated with each of the detected wireless access gateways. The location data can be received from a server connected to mobile device 100 through a communications network using a wired or wireless connection, or from a location data store coupled to the system 300.

The received location data can include an estimated location of each detected wireless access gateway, an uncertainty value associated with the estimated location, and a reach of each detected wireless access gateway. The estimated location of each detected wireless access gateway can include a latitude coordinate and a longitude coordinate of the wireless access gateway. In some implementations, the estimated location of each detected wireless access gateway can include an altitude coordinate of the wireless access gateway. The uncertainty value can indicate an estimation accuracy of the estimated location. The reach of each wireless access gateway can indicate how far away the wireless access gateway is expected to be observed by a mobile device.

System 300 can weight (406) the estimated locations of the detected wireless access gateways using (1) the uncertainty value associated with each estimated location; (2) the reach of each detected wireless access gateway; and (3) the measured closeness between the mobile device and each detected wireless access gateway.

Weighting the estimated locations can include assigning a larger weight to a wireless access gateway having a smaller reach, assigning a larger weight to a wireless access gateway having a smaller uncertainty value, and assigning a larger weight to a wireless access gateway that is closer to the mobile device. Weighting the estimated locations can include determining the weight using a weight A, reach weight B, and closeness weight C as described above in formulae (1)-(4) in reference to FIG. 2A.

System 300 can determine (408) a location of mobile device 100 based on the weighted locations. Determining the location of mobile device 100 can include determining an average of the weighted locations. The location can be displayed on a display device or given as an input to one or more system functions or application programs. The system can determine, based on the weighted locations, an estimated uncertainty associated with the location of the mobile device using the following formula.

$$u = E[\text{loc}^2] - E[\text{loc}]^2, \qquad (5)$$

where u is the uncertainty value; E[loc] is the estimated location; and E[loc$^2$] is the second moment of the estimated location.

The system can optionally perform operations to remove outliers in the location data. The operations of removing outliers will be described in further detail below in reference to FIG. 5.

Figure 5:
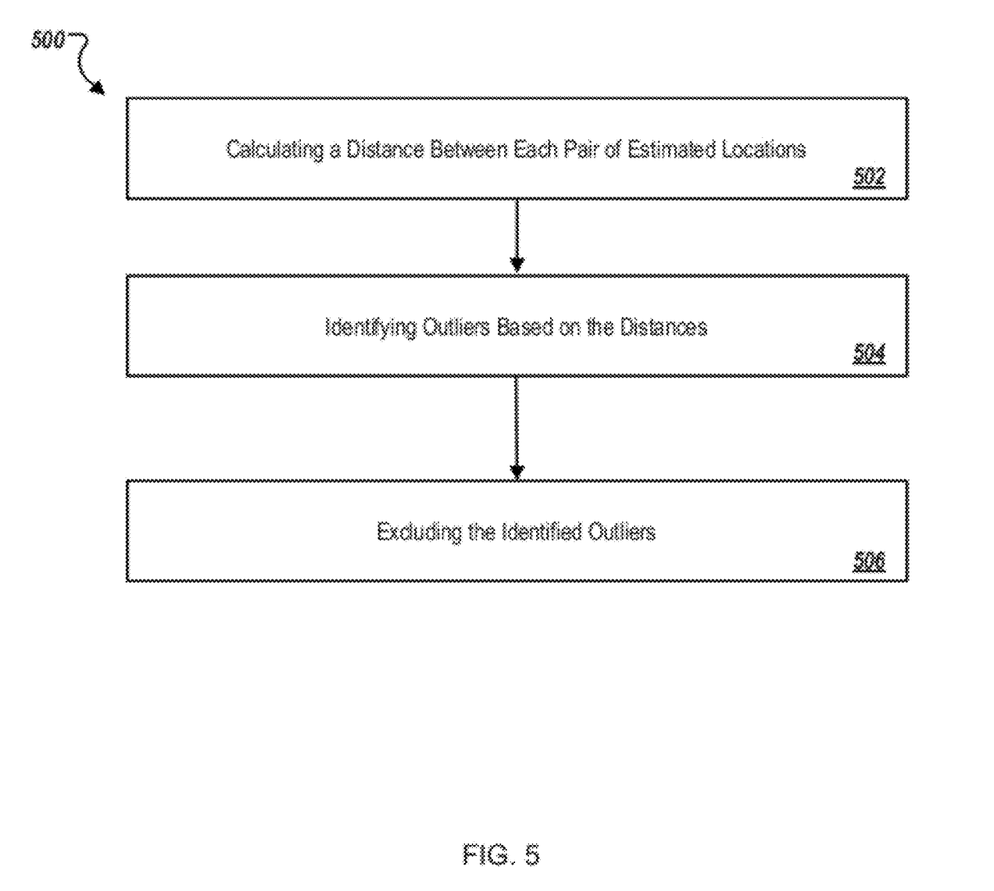
FIG. 5 is a flowchart of an exemplary process of removing outliers in location estimation.

FIG. 5 is a flowchart of exemplary process 500 of removing outliers in location estimation. The process can be performed by system 300 of mobile device 100, as described above in reference to FIG. 3.

The system can receive estimated locations of wireless access gateways detected in a scan. The system can calculate (502) a distance between each pair of the estimated locations. The distance can be a Euclidean distance in a two-dimensional or three-dimensional space.

The system can identify (504) an outlier from the estimated locations. The system can determine, based on the calculated distances, that a wireless access gateway is located at a location significantly different from other estimated locations. The wireless access gateway is located at a location significantly different from other estimated locations if, for example, the distance between the wireless access gateway and other wireless access gateways exceeds a maximum reach among the reaches of the detected wireless access gateways. The system can designate this wireless access gateway as an outlier. The system can exclude (506) the outlier from further calculations.

Exemplary User Interface

Figure 6:
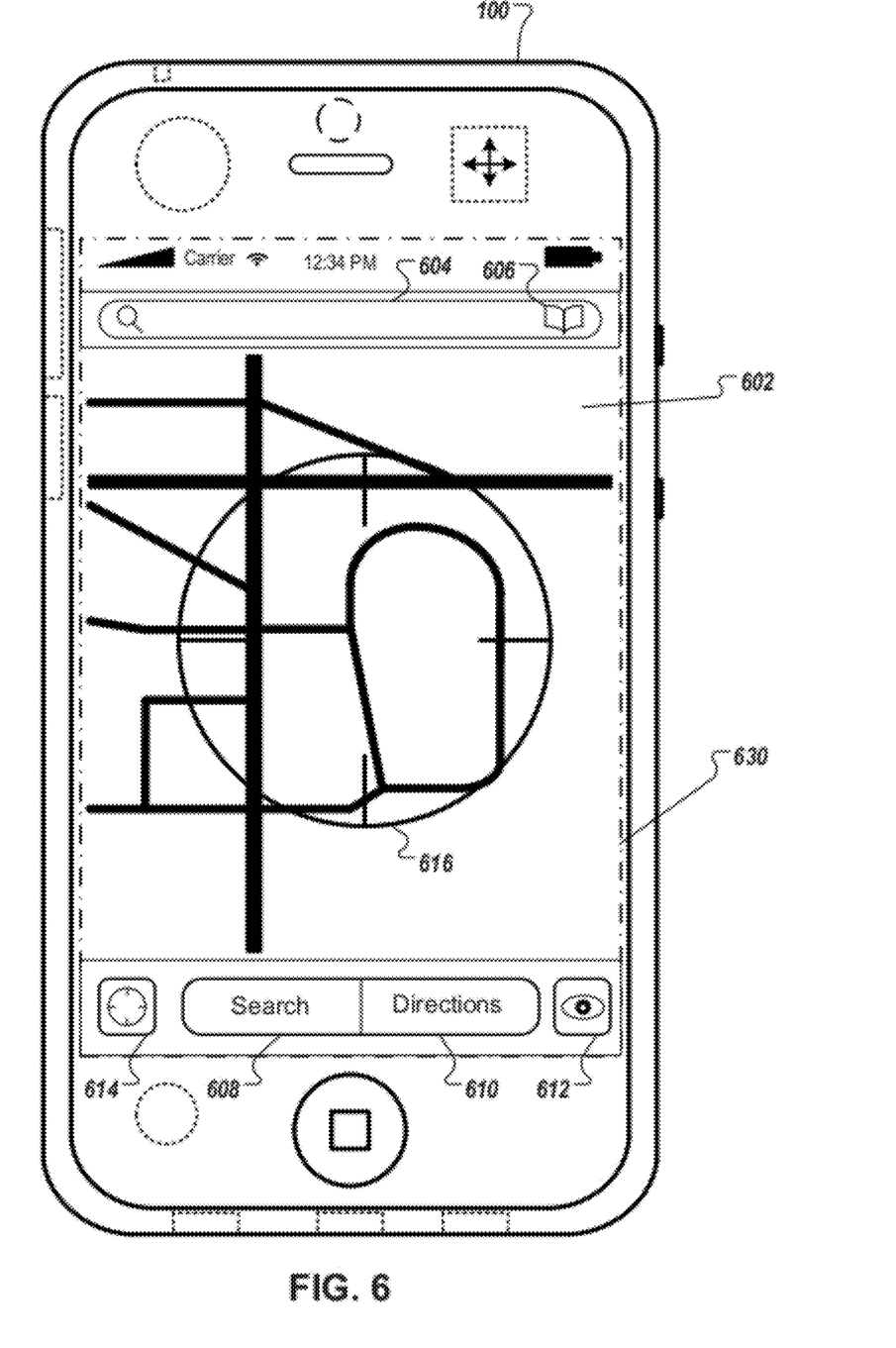
FIG. 6 illustrates an exemplary user interface displaying an estimated location.

FIG. 6 is an exemplary location user interface 320 of mobile device 100. Mobile device 100 can include a touch-sensitive display device 630. Mobile device 100 can display map 602 of a geographic area on touch-sensitive display device 630.

The search bar 604 can be used to find an address or other location on the map. For example, a user can enter their home address in the search bar 604, and the region containing the address would be displayed on the map 602. The bookmarks list object 606 can, for example, bring up a Bookmarks list that contains addresses that are frequently visited, such as a user's home address. The Bookmarks list can also, for example, contain special bookmarks such as the current location (e.g. the current location of mobile device 100).

The search object 608 can be used to display the search bar 604 and other map related search menus. The directions object 610 can, for example, bring up a menu interface that allows the user to enter a start and end location. The interface can then display information (e.g., directions and travel time for a route from the start location to the end location). The map view object 612 can bring up a menu that will allow the user to select display options for the map 602. For example, the map 602 can be changed from black and white to color, the background of the map can be changed, or the user can change the brightness of the map.

The current location object 614 can allow the user to see a geographic area 616 on the map 602 indicating where the mobile device 100 is currently located. Geographic area 616 can correspond to geographic location of mobile device 100 estimated using the operations described above in reference to FIGS. 1-5. The estimated location can be determined based on estimated locations of wireless access gateways that are within communication range of mobile device 100. A radius of geographic area 616 can correspond to an uncertainty of the estimated location. The uncertainty can be determined as described above in formula (5) in reference to FIG. 4. A special current location bookmark can be placed in the Bookmarks list when the current location object 614 is selected. If the special current location bookmark was previously set in the Bookmarks list, the old bookmark information can, for example, be replaced with the new current location information. In some implementations, the special current location bookmark is tied to the centroid of geographic area 616. That is, the special current location bookmark can include the coordinates for the centroid of the geographic area 616. The geographic area 616 can be based on location data determined or estimated using location instructions stored in a memory device of mobile device 100. The geographic area 616 can, for example, be depicted by a circle, rectangle, square, hexagon, or other enclosed region with crosshairs, or some other distinctive element to differentiate the geographic area 616 from the map 602.

Exemplary Mobile Device Architecture

Figure 7:
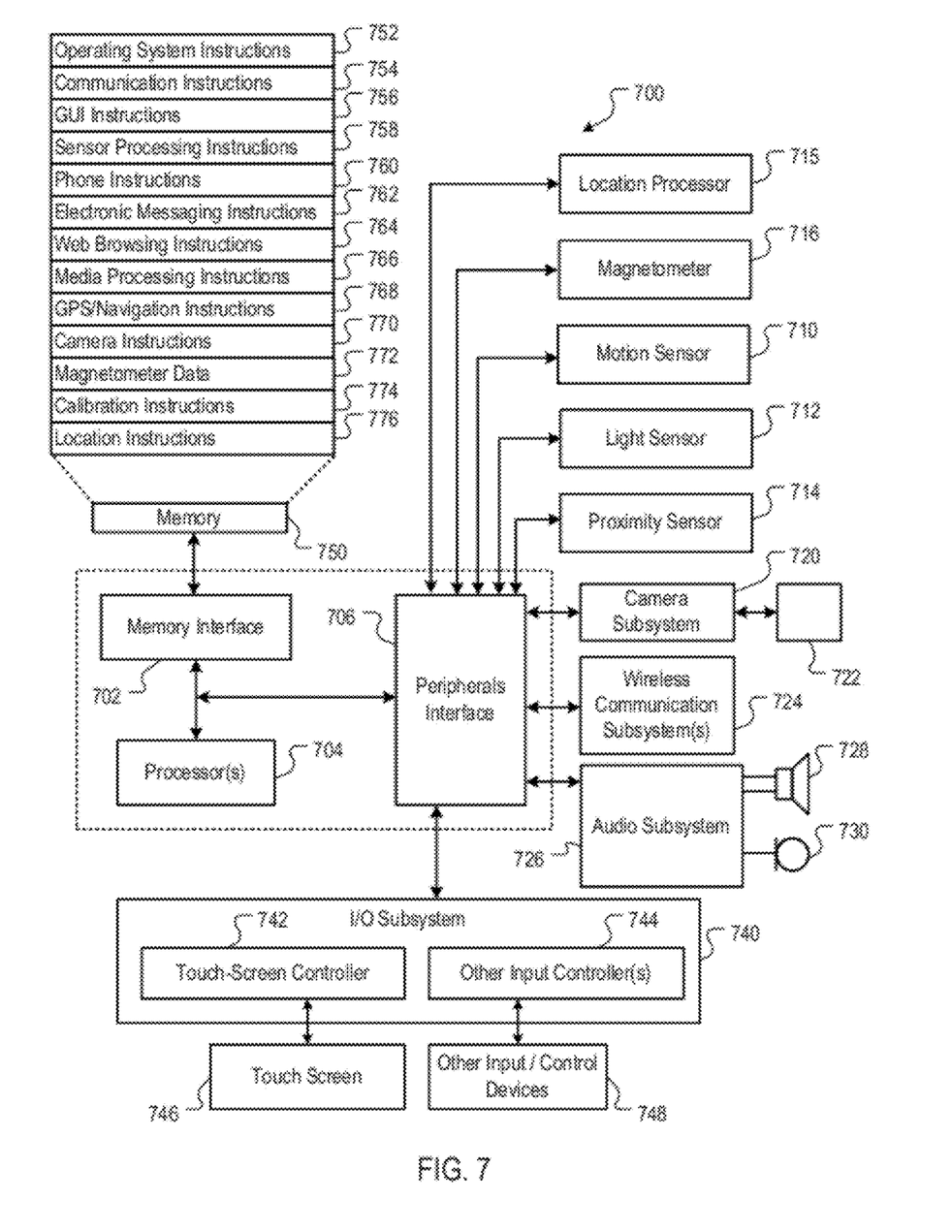
FIG. 7 is a block diagram illustrating an exemplary device architecture of a mobile device implementing the features and operations of location estimation.

FIG. 7 is a block diagram illustrating an exemplary device architecture 700 of a mobile device implementing the features and operations of sending location data to a server and determining a current location using wireless access gateways. A mobile device can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include one or more application processors (APs), one or more baseband processors (BPs), and/or one or more wireless processors. The application processors and baseband processors can be integrated in one single process chip. The various components in mobile device 100, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a CDMA system, a WiFi™ or WiMax™ network, and a Bluetooth™ network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 100 on or off. The user may be able to customize a functionality of one or more of the buttons. The touch screen 746 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player. Mobile device 100 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include location instructions 776. Location instructions 776 can be a computer program product that is configured to cause the mobile device to determine a location using estimated locations of detected wireless access gateways, as described in reference to FIGS. 1-6.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
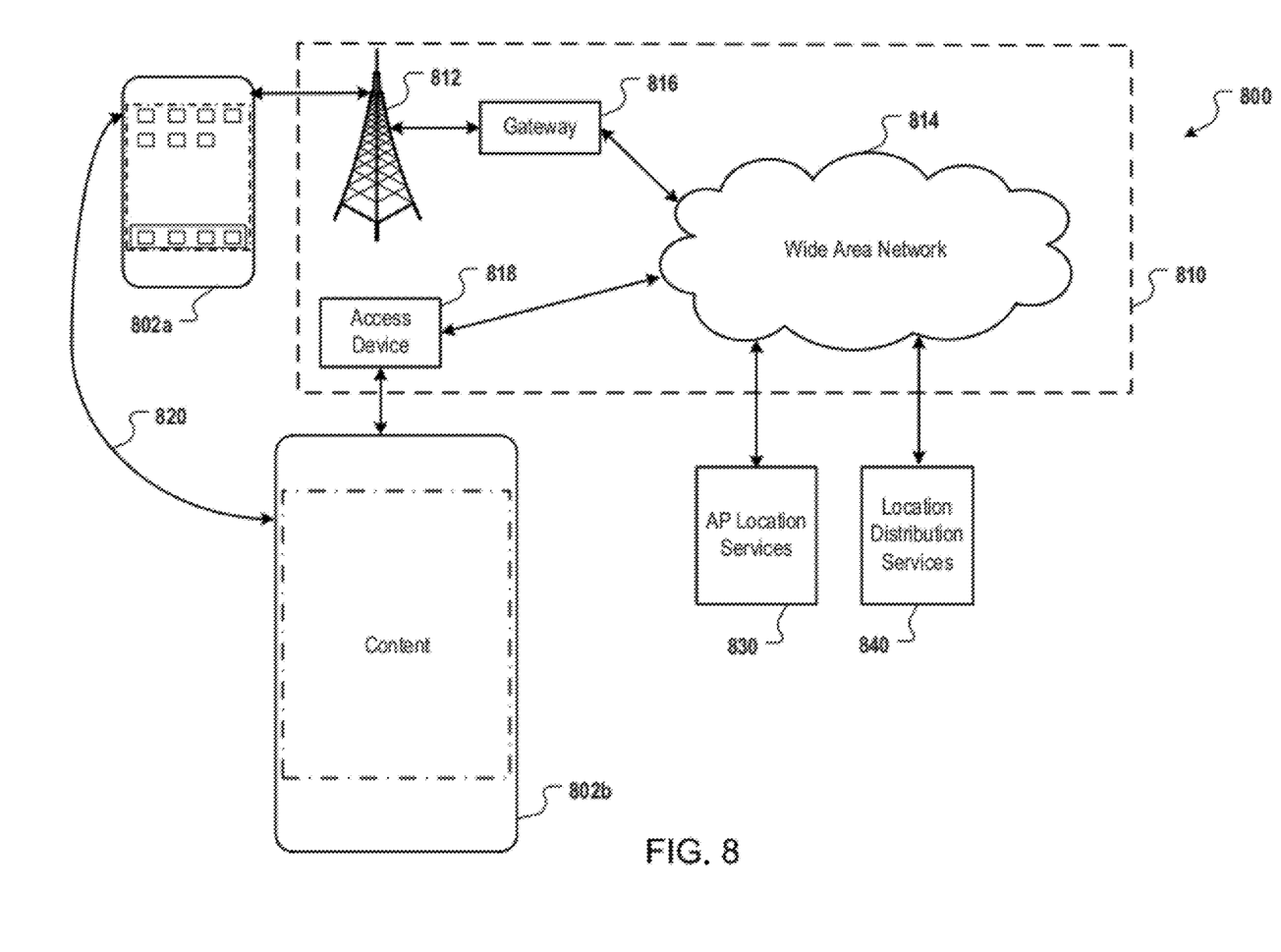
FIG. 8 is a block diagram of exemplary network operating environment for mobile devices performing location estimation.

FIG. 8 is a block diagram of exemplary network operating environment 800 for the mobile devices implementing motion pattern classification and gesture recognition techniques. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access gateway, can provide communication access to the wide area network 814.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless mobile device 802a can communicate with other wireless devices, e.g., other mobile devices 802a or 802b, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830 and 840 over the one or more wired and/or wireless networks. For example, one or more wireless access gateway location determination services 830 can be used to determine locations of wireless access gateways. Location distribution services 840 can receive requests from mobile devices 802a and 802b. The requests can include identifiers of one or more wireless access gateways detected by mobile devices 802a and 802b. In response, location distribution services 840 can provide estimated locations associated with the identifiers to mobile devices 802a and 802b.

Mobile device 802a or 802b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

The invention claimed is:

1. A method performed by a mobile device, comprising:
   detecting, on the mobile device, a plurality of wireless access devices;
   determining a closeness between the mobile device and each wireless access device, the closeness including an initial measurement of distance between the mobile device and each wireless access device;
   receiving location data associated with each of the detected wireless access devices, the location data including an estimated location of each detected wireless access device, an uncertainty value associated with the estimated location, and a reach of each detected wireless access device;
weighting the estimated locations using the uncertainty values, the reaches of the wireless access devices, and the closeness, wherein weighting the estimated locations comprises:
   determining a reach weight of the estimated location based on the reach of a corresponding wireless access device;
   determining an uncertainty weight of each estimated location based on the uncertainty value of the estimated location;
   determining a closeness weight of each estimated location based on the closeness between the mobile device and the corresponding wireless access device; and
   determining a weight of each estimated location using each of the reach weight of the corresponding estimated location, the uncertainty weight of the corresponding estimated location, and the closeness weight of the corresponding estimated location as a factor of the determining, wherein each of a smaller reach, a smaller uncertainty value, or a smaller closeness causes the weight to be larger; and
determining the location of the mobile device based on the weighted locations.

2. The method of claim 1, wherein each of the wireless access devices includes at least one wireless access gateway, the wireless access gateway being a cell tower, a wireless router, or a Bluetooth™ device.

3. The method of claim 1, wherein determining the closeness is based on at least one of:
   a signal strength of a signal from the wireless access device;
   a round-trip time of a signal between the mobile device and the wireless access device; or
   a bit error rate of a signal between the mobile device and the wireless access device.

4. The method of claim 1, wherein the estimated location of each wireless access device includes a latitude coordinate and a longitude coordinate of the wireless access device.

5. The method of claim 1, wherein the estimated location of each wireless access device includes an altitude coordinate of the wireless access device.

6. The method of claim 1, wherein the reach of each wireless access device indicates how far away the wireless access device is expected to be observed by a mobile device.

7. The method of claim 1, wherein the uncertainty value indicates an estimation accuracy of the estimated location.

8. The method of claim 1, wherein determining the weight of each estimated location comprises:
   multiplying:
      the uncertainty weight,
      the closeness weight, and
      a unit value minus the reach weight; and then
      adding a product of the uncertainty weight and the reach weight.

9. The method of claim 1, comprising:
   identifying an outlier from the detected wireless access devices; and
   excluding the outlier from the operations of weighting the estimated locations and determining the location of the mobile device.

10. The method of claim 9, wherein identifying the outlier comprises:
   identifying an estimated location from the received location data, wherein a distance between the estimated location and other estimated locations exceeds a maximum reach among the reaches of the detected wireless access devices; and
   designating a wireless access device associated with the identified estimated location as the outlier.

11. The method of claim 1, comprising determining, based on the weighted locations, an estimated uncertainty associated with the location of the mobile device.

12. A computer program product tangibly stored on a non-transitory medium and configured to cause a mobile device to perform operations comprising:
   detecting, on the mobile device, a plurality of wireless access devices;
   determining a closeness between the mobile device and each wireless access device, the closeness including an initial measurement of distance between the mobile device and each wireless access device;
   receiving location data associated with each of the detected wireless access devices, the location data including an estimated location of each detected wireless access device, an uncertainty value associated with the estimated location, and a reach of each detected wireless access device;
   weighting the estimated locations using the uncertainty values, the reaches of the wireless access devices and the closeness, wherein weighting the estimated locations comprises:
      determining a reach weight of the estimated location based on the reach of a corresponding wireless access device;
      determining an uncertainty weight of each estimated location based on the uncertainty value of the estimated location;
      determining a closeness weight of each estimated location based on the closeness between the mobile device and the corresponding wireless access device; and
      determining a weight of each estimated location using each of the reach weight of the corresponding estimated location, the uncertainty weight of the corresponding estimated location, and the closeness weight of the corresponding estimated location as a factor of the determining, wherein each of a smaller reach, a smaller uncertainty value, or a smaller closeness causes the weight to be larger; and
   determining the location of the mobile device based on the weighted locations.

13. The product of claim 12, wherein each of the wireless access devices includes at least one wireless access gateway, the wireless access gateway being a cell tower, a wireless router, or a Bluetooth™ device.

14. The product of claim 12, wherein determining the closeness is based on at least one of:
   a signal strength of a signal from the wireless access device;
   a round-trip time of a signal between the mobile device and the wireless access device; or
   a bit error rate of a signal between the mobile device and the wireless access device.

15. The product of claim 12, wherein the estimated location of each wireless access device includes a latitude coordinate and a longitude coordinate of the wireless access device.

16. The product of claim 12, wherein the estimated location of each wireless access device includes an altitude coordinate of the wireless access device.

17. The product of claim 12, wherein the reach of each wireless access device indicates how far away the wireless access device is expected to be observed by a mobile device.

18. The product of claim 12, wherein the uncertainty value indicates an estimation accuracy of the estimated location.

19. The product of claim 12, wherein determining the weight of each estimated location comprises:
multiplying:
the uncertainty weight,
the closeness weight, and
a unit value minus the reach weight; and then
adding a product of the uncertainty weight and the reach weight.

20. The product of claim 12, the operations comprising:
identifying an outlier from the detected wireless access devices; and
excluding the outlier from the operations of weighting the estimated locations and determining the location of the mobile device.

21. The product of claim 20, wherein identifying the outlier comprises:
identifying an estimated location from the received location data, wherein a distance between the estimated location and other estimated locations exceeds a maximum reach among the reaches of the detected wireless access devices; and
designating a wireless access device associated with the identified estimated location as the outlier.

22. The product of claim 12, the operations comprising determining, based on the weighted locations, an estimated uncertainty associated with the location of the mobile device.

23. A system, comprising:
a transceiver for detecting, on a mobile device, a plurality of wireless access devices;
a signal processing unit comprising a signal analyzer and a processor, the signal processing unit configured to determine a closeness between the mobile device and each wireless access device, the closeness including an initial measurement of distance between the mobile device and each wireless access device;
a communication subsystem for receiving location data associated with each of the detected wireless access devices, the location data including an estimated location of each detected wireless access device, an uncertainty value associated with the estimated location, and a reach of each detected wireless access device; and
a location calculation unit comprising:
one or more processors configured to perform operations including weighting the estimated locations using the uncertainty values, the reaches of the wireless access devices, and the closeness, wherein weighting the estimated locations comprises:
determining a reach weight of the estimated location based on the reach of a corresponding wireless access device;
determining an uncertainty weight of each estimated location based on the uncertainty value of the estimated location;
determining a closeness weight of each estimated location based on the closeness between the mobile device and the corresponding wireless access device; and
determining a weight of each estimated location using each of the reach weight of the corresponding estimated location, the uncertainty weight of the corresponding estimated location, and the closeness weight of the corresponding estimated location as a factor of the determining, wherein each of a smaller reach, a smaller uncertainty value, or a smaller closeness causes the weight to be larger; and
a location estimation unit for determining the location of the mobile device based on the weighted locations.

24. The system of claim 23, wherein each of the wireless access devices includes at least one wireless access gateway, the wireless access gateway being a cell tower, a wireless router, or a Bluetooth™ device.

25. The system of claim 23, wherein determining the closeness is based on at least one of:
a signal strength of a signal from the wireless access device;
a round-trip time of a signal between the mobile device and the wireless access device; or
a bit error rate of a signal between the mobile device and the wireless access device.

26. The system of claim 23, wherein the estimated location of each wireless access device includes a latitude coordinate and a longitude coordinate of the wireless access device.

27. The system of claim 23, wherein the estimated location of each wireless access device includes an altitude coordinate of the wireless access device.

28. The system of claim 23, wherein the reach of each wireless access device indicates how far away the wireless access device is expected to be observed by a mobile device.

29. The system of claim 23, wherein the uncertainty value indicates an estimation accuracy of the estimated location.

30. The system of claim 23, wherein determining the weight of each estimated locations comprises:
multiplying:
the uncertainty weight,
the closeness weight, and
a unit value minus the reach weight; and then
adding a product of the uncertainty weight and the reach weight.

31. The system of claim 23, the operations comprising:
identifying an outlier from the detected wireless access devices; and
excluding the outlier from the operations of weighting the estimated locations and determining the location of the mobile device.

32. The system of claim 31, wherein identifying the outlier comprises:
identifying an estimated location from the received location data, wherein a distance between the estimated location and other estimated locations exceeds a maximum reach among the reaches of the detected wireless access devices; and
designating a wireless access device associated with the identified estimated location as the outlier.

33. The system of claim 23, the operations comprising determining, based on the weighted locations, an estimated uncertainty associated with the location of the mobile device.

* * * * *

UNITED STATES PATENT AND TRADEMARK OFFICE
CERTIFICATE OF CORRECTION

PATENT NO. : 8,494,554 B2
APPLICATION NO. : 13/153104
DATED : July 23, 2013
INVENTOR(S) : Lukas M. Marti et al.

Page 1 of 1

It is certified that error appears in the above-identified patent and that said Letters Patent is hereby corrected as shown below:

On Title Page 2, under item (56), Other Publications, column 2, line 2, delete "20TECHNIOUE." and insert -- 20TECHNIQUE. --.

In the Claims:

In Claim 12, column 14, line 25, delete "devices and" and insert -- devices, and --.

In Claim 30, column 16, line 34, delete "locations" and insert -- location --.

Signed and Sealed this
Fifteenth Day of October, 2013

Teresa Stanek Rea
*Deputy Director of the United States Patent and Trademark Office*